US009167654B2

(12) United States Patent
Watanabe et al.

(10) Patent No.: US 9,167,654 B2
(45) Date of Patent: Oct. 20, 2015

(54) SOLID LIGHT SOURCE LIGHTING DEVICE, ILLUMINATION APPARATUS, AND ILLUMINATION SYSTEM

(71) Applicant: Panasonic Intellectual Property Management Co., Ltd., Osaka (JP)

(72) Inventors: Koji Watanabe, Kyoto (JP); Yoshifumi Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/413,146

(22) PCT Filed: Jun. 11, 2013

(86) PCT No.: PCT/JP2013/003670
§ 371 (c)(1),
(2) Date: Jan. 6, 2015

(87) PCT Pub. No.: WO2014/010168
PCT Pub. Date: Jan. 16, 2014

(65) Prior Publication Data
US 2015/0201477 A1 Jul. 16, 2015

(30) Foreign Application Priority Data

Jul. 11, 2012 (JP) ................................ 2012-155687

(51) Int. Cl.
*H05B 33/08* (2006.01)
(52) U.S. Cl.
CPC ........ *H05B 33/0851* (2013.01); *H05B 33/0815* (2013.01); *H05B 33/0818* (2013.01); *H05B 33/0896* (2013.01); *Y02B 20/346* (2013.01)
(58) Field of Classification Search
None
See application file for complete search history.

(56) References Cited

U.S. PATENT DOCUMENTS 6,690,121 B1 * 2/2004 Weindorf ...................... 315/247
8,736,190 B2 * 5/2014 Kotowski et al. ............. 315/247
(Continued)

FOREIGN PATENT DOCUMENTS

JP 2005-347133 A 12/2005
JP 2010-176853 A 8/2010
(Continued)

OTHER PUBLICATIONS

International Search Report for corresponding International Application No. PCT/JP2013/003670 mailed Aug. 6, 2013.
(Continued)

*Primary Examiner* — Crystal L Hammond
(74) *Attorney, Agent, or Firm* — Renner, Otto, Boisselle & Sklar, LLP (57) ABSTRACT

A solid light source lighting device includes: a step-down chopper circuit including a switching element and outputting a DC power by turning on and off the switching element; a capacitor connected in parallel to a solid light source connected across output terminals of the step-down chopper circuit; and a control circuit determining a control value for a switching operation of the switching element based on a dimming signal for indicating a dimming ratio of the solid light source, and performing switching control of the switching element based on the control value. When performing switching control of the switching element so that the dimming ratio becomes high based on the dimming signal indicating a first dimming ratio, the control circuit performs the switching control of the switching element based on the control value that becomes a second dimming ratio higher than the first dimming ratio for a prescribed time period.

15 Claims, 9 Drawing Sheets

(56) References Cited

U.S. PATENT DOCUMENTS

| | | | |
|---|---|---|---|
| 2007/0040516 A1* | 2/2007 | Chen | 315/291 |
| 2007/0247084 A1* | 10/2007 | Zhao | 315/291 |
| 2010/0219764 A1* | 9/2010 | Yamasaki et al. | 315/224 |
| 2012/0223651 A1* | 9/2012 | Murakami et al. | 315/224 |
| 2012/0262080 A1* | 10/2012 | Watanabe et al. | 315/210 |
| 2012/0286686 A1* | 11/2012 | Watanabe et al. | 315/224 |
| 2013/0293134 A1* | 11/2013 | Ishikita et al. | 315/210 |

FOREIGN PATENT DOCUMENTS

| | | |
|---|---|---|
| JP | 2010-205778 A | 9/2010 |
| JP | 2011-060615 A | 3/2011 |
| JP | 2011-100621 A | 5/2011 |
| JP | 2011-108668 A | 6/2011 |
| JP | 2011-150878 A | 8/2011 |
| JP | 2011-211132 A | 10/2011 |
| JP | 2012-054154 A | 3/2012 |

OTHER PUBLICATIONS

Form PCT/ISA/237 for corresponding International Application No. PCT/JP2013/003670 dated Aug. 6, 2013.

* cited by examiner

SOLID LIGHT SOURCE LIGHTING DEVICE, ILLUMINATION APPARATUS, AND ILLUMINATION SYSTEM

TECHNICAL FIELD

The present invention relates to a solid light source lighting device, an illumination apparatus, and an illumination system that perform a dimming of a solid light source.

BACKGROUND ART

In recent years, there is a solid light source lighting device that performs a dimming of a solid light source using a LED (Light Emitting Diode) element, an organic EL (Electro Luminescence) device, or the like.

Generally, the solid light source lighting device is configured to control current flowing through solid light sources by a switching circuit (step-down chopper circuit, flyback circuit, or the like), and determine an amount of current flowing to the solid light sources with a dimming signal from a dimming signal generator, and dim the solid light sources.

Figure 10:
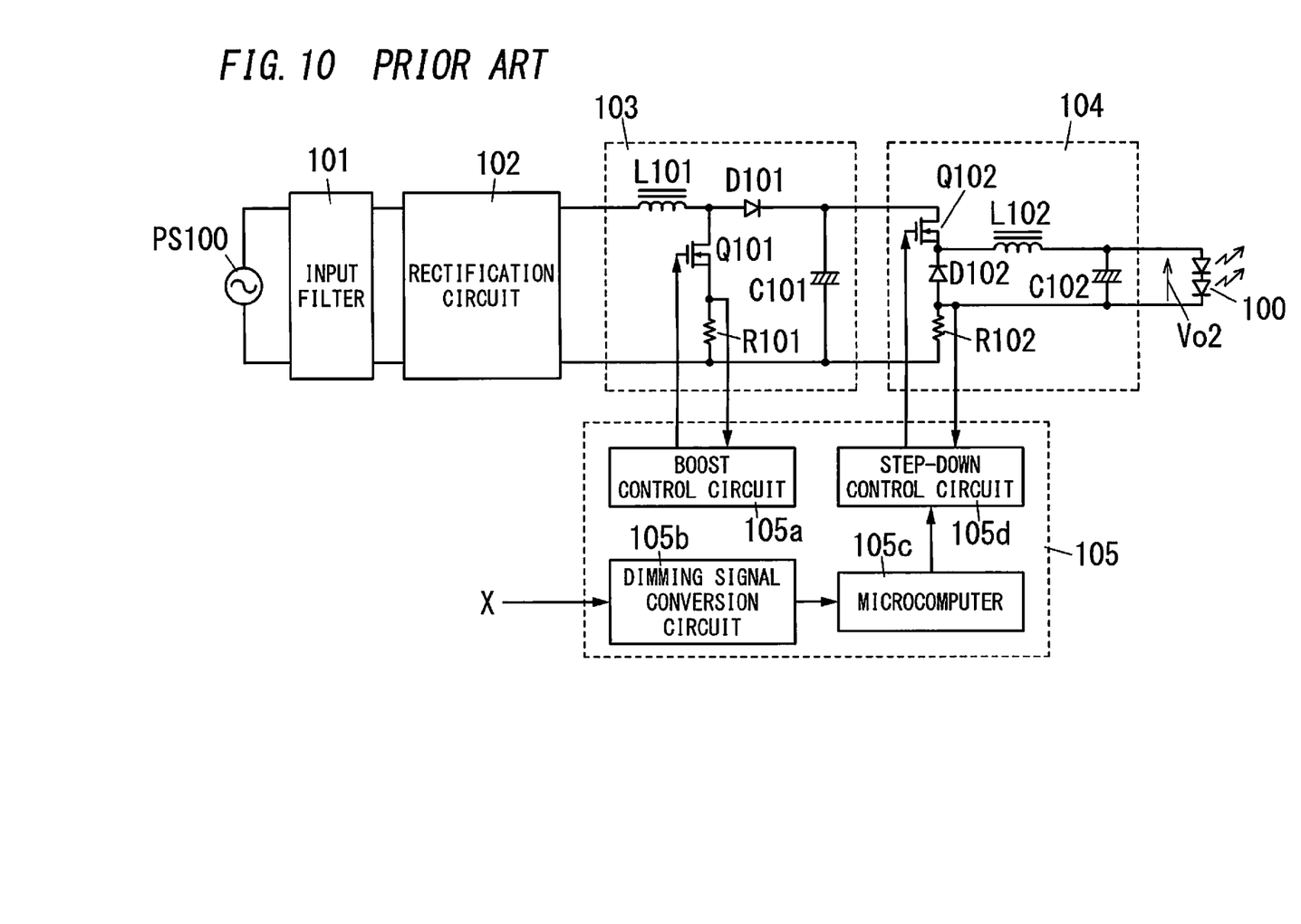
FIG. 10 is a circuit diagram illustrating a configuration of the conventional solid light source lighting device.

For example, there is a conventional solid light source lighting device, which includes a input filter 101, a rectification circuit 102, a boost chopper circuit 103, a step-down chopper circuit 104, and a control circuit 105 as shown in FIG. 10.

The input filter 101 is configured to receive electrical power from a commercial power supply PS100, and remove an unnecessary frequency component such as a noise.

The rectification circuit 102 is configured to output a rectified voltage that is generated by performing a rectification (full wave rectification or half-wave rectification) of an AC voltage inputted via the input filter 101.

The boost chopper circuit 103 includes a series circuit of an inductor L101 and a diode D101 that are connected to a high potential side of the rectified voltage. Further, a series circuit of a switching element Q101 and a resistor R101 is connected between output ends of the rectification circuit 102 via the inductor L101. Further, a capacitor C101 is connected between output ends of the boost chopper circuit 103. Then, when the switching element Q101 turns on and turns off, a boost voltage occurs at both ends of the capacitor C101.

In the step-down chopper circuit 104, a switching element Q102, an inductor L102, a capacitor C102, and a resistor R102 are connected in series between both ends of the capacitor C101. Further, a diode D102 for regeneration is connected to a series circuit of an inductor L102 and a capacitor C102. Then, a solid light source 100 using LED elements, organic EL elements, or the like are connected between both ends of the capacitor C102. When the switching element Q102 turns on and turns off, step-down voltage occurs to both ends of the capacitor C102.

The control circuit 105 includes a boost control circuit 105a, a dimming signal conversion circuit 105b, a microcomputer 105c, and a step-down control circuit 105d.

The boost control circuit 105a is configured to control a boost operation of the boost chopper circuit 103 by performing a switching control of on/off of the switching element Q101.

Then, a dimming signal X inputted into the control circuit 105 from the outside is a PWM (Pulse Width Modulation) signal that made duty cycle variable according to a dimming ratio. The dimming signal conversion circuit 105b is configured to convert the dimming signal X to a DC voltage according to the duty cycle, and then, output the DC voltage to an A/D conversion port of the microcomputer 105c.

The microcomputer 105c is configured to store previously a dimming curve (dimming characteristic) in which a dimming ratio becomes low as the duty cycle of the dimming signal X is large. Then, the microcomputer 105c is configured to calculate a dimming ratio (value of output current) according to the DC voltage (equivalent to the duty cycle of the dimming signal X) inputted from the dimming signal conversion circuit 105b with reference to the dimming curve. The microcomputer 105c is configured to generate a step-down control signal S according to the calculated dimming ratio, and then output this step-down control signal S to the step-down control circuit 105d. This step-down control signal S is a signal that indicates the dimming ratio.

The step-down control circuit 105d is configured to control a step-down operation of the step-down chopper circuit 104 by performing a switching control of on/off of the switching element Q102 based on the step-down control signal S.

There are a DC dimming that makes a direct current supplied to the solid light source 100 (for example, see JP 2005-347133 A and JP 2010-205778 A), and a burst dimming that turns on and turns off a direct current and performs a PWM control (for example, see JP 2011-150878 A), as the dimming method of the solid light source 100. There is also the dimming method that combines the direct current dimming and the burst dimming (for example, see JP 2011-108668 A).

At the time of dimming, there is the case where a video flicker caused by matching with the optical power waveform of the solid light source 100 and a movie camera machine, such as a video camera. In order to suppress this video flicker, it is necessary to make small the difference of the peak value and the bottom value of the current flowing through the solid light source 100 as possible, and bring the current flowing through the solid light source 100 close to a DC wave with few current ripples.

Then, the capacitor C102 is connected to the output of the step-down chopper circuit 104, that is, the solid light source 100 in parallel. Therefore, the difference of the peak value and the bottom value of the current can be made small, and accordingly, it is possible to bring the current close to the DC wave with few current ripples (for example, see JP 2011-60615 A). In this time, a voltage Vo2 (hereinafter, referred to as an "output voltage Vo2") across the capacitor C102 is substantially equal to the forward voltage of the solid light source 100. The forward voltage of the solid light source 100 is determined based on a dimming ratio (value of the output current) according to the forward current-forward voltage characteristic of the solid light source 100.

The conventional solid light source lighting device shown in FIG. 10 had the following problem when the forward voltage of the solid light source 100 is too high, or when the capacity of the capacitor C102 is too large.

Figure 11:
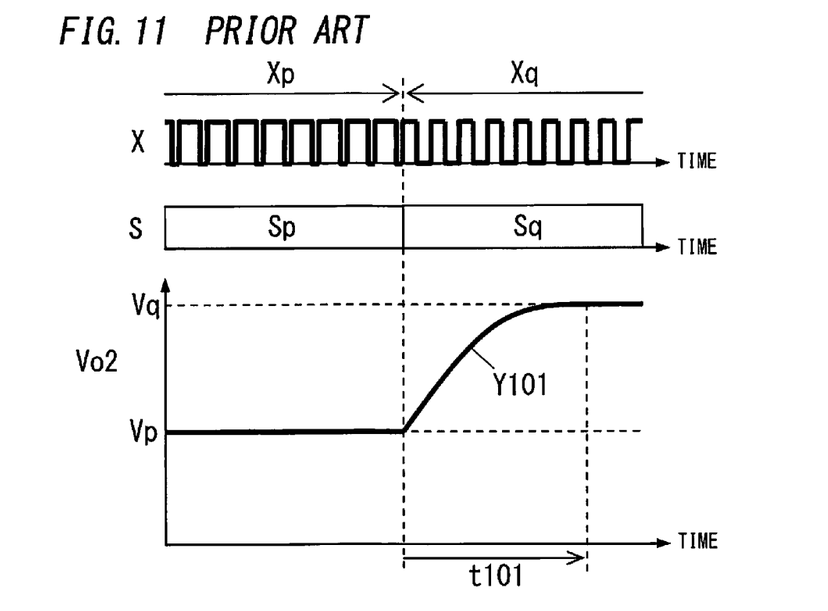
FIG. 11 is a wave form chart illustrating an operation of each part of the conventional solid light source lighting device at the time of a dimming operation.

First, as shown in FIG. 11, it is assumed that the dimming signal Xp indicating the present dimming ratio (first dimming ratio) is changed to the dimming signal Xq indicating the higher dimming ratio (second dimming ratio) at the time of lighting of the solid light source 100. In this case, the step-down control signal S outputted from the microcomputer 105c changes from the step-down control signal Sp indicating the first dimming ratio to the step-down control signal Sq indicating the second dimming ratio.

However, when the optical power of the solid light source 100 is raised from the first dimming ratio to the second dimming ratio (first dimming ratio< second dimming ratio), the charging time period of the capacitor C102 is required. Therefore, the response time period t101 is taken for raising the output voltage Vo1 from the output voltage Vp equivalent to the first dimming ratio to the output voltage Vq equivalent to the second dimming ratio (refer to Y101 in FIG. 11).

Figure 12:
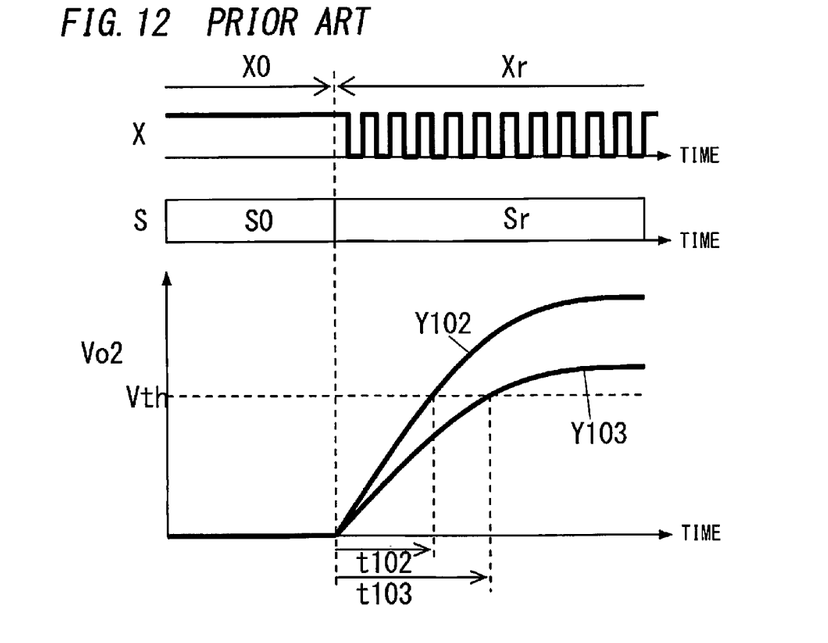
FIG. 12 is a wave form chart illustrating an operation of each part of the conventional solid light source lighting device at the time of another dimming operation.

As shown in FIG. 12, it is assumed that the dimming signal Xr indicating the higher dimming ratio (first dimming ratio) is inputted at a lighting-off state of the solid light source 100 instead of the dimming signal X0 indicating turning off (dimming ratio 0%). In this case, the step-down control signal S outputted from the microcomputer 105c changes from the step-down control signal S0 indicating a dimming ratio of 0% to the step-down control signal Sr indicating the first dimming ratio.

However, when the optical power of the solid light source 100 is raised from the lighting-off state to the first dimming ratio, the charging time period of the capacitor C102 is required. Therefore, the response time period t102 is taken until the output voltage Vo2 reaches the forward voltage Vth, at which the solid light source 100 starts lighting (refer to Y102 in FIG. 12). When the dimming ratio as a target is lower than the first dimming ratio, the response time period t103 taken until the output voltage V2 becomes the forward voltage Vth becomes longer than the time t102 (refer to Y103 in FIG. 12).

That is, when the solid light source 100 lights at a dimming lower limit from the lighting-off state, the current supplied to the solid light source 100 decreases as the value of the dimming lower limit is low, and then, the charge of the capacitor C102 decreases. That is, since there are few charges of the capacitor C102, the response time period taken until the solid light source 100 start lighting or the response time period until the solid light source 100 reaches a desired dimming ratio become too long. That is, there is a possibility that the dimming ratio of the dimming lower limit is restricted depending on the maximum of the permissible response time period.

DISCLOSURE OF INVENTION

The present invention has been made in view of the above-described problems, and an object of the present invention is to provide a solid light source lighting device, an illumination apparatus, and an illumination system, in which it is possible to shorten the response time period of actual optical output when a dimming control is performed so that a dimming ratio increases.

A solid light source lighting device according to the present invention includes a power supply circuit, a capacitor, and a control circuit. The power supply circuit includes at least one switching element. The power supply circuit is configured to output DC power by turning on and turning off the switching element. The capacitor is connected to a solid light source in parallel. The solid light source is connected between output ends of the power supply circuit. The control circuit is configured to determine a control value for a switching operation of the switching element based on a dimming signal indicating a dimming ratio of the solid light source. The control circuit is configured to perform a switching control of the switching element based on the control value. The control circuit is configured, when performing the switching control of the switching element so that the dimming ratio increases due to the dimming signal indicating a first dimming ratio, to perform the switching control of the switching element based on the control value equivalent to a second dimming ratio higher than the first dimming ratio during a prescribed time period before the switching control of the switching element is performed based on the control value equivalent to the first dimming ratio.

In the present invention, preferably, the prescribed time period is: a time period to a time when a prescribed time period passes from a time when the control circuit receives the dimming signal indicating the first dimming ratio while performing the switching control of the switching element based on the control value equivalent to a third dimming ratio lower than the first dimming ratio; or a time period to a time when a prescribed time period passes from a time when the control circuit receives the dimming signal indicating the first dimming ratio while the solid light source lights off.

In the present invention, preferably, the solid light source lighting device further includes a voltage detection circuit. The voltage detection circuit is preferably configured to detect a voltage across the solid light source. Preferably, the prescribed time period is: a time period to a time when the voltage across the solid light source becomes a threshold or more from a time when the control circuit receives the dimming signal indicating the first dimming ratio while performing the switching control of the switching element based on the control value equivalent to a third dimming ratio lower than the first dimming ratio; or a time period to a time when the voltage across the solid light source is the threshold or more from a time when the control circuit receives the dimming signal indicating the first dimming ratio while the solid light source lights off.

In the present invention, preferably, the solid light source lighting device further includes a storage part. The storage part is preferably configured to store an operating time period of the solid light source lighting device or a lighting time period of the solid light source. The control circuit is preferably configured to determine the prescribed time period based on the operating time period or the lighting time period.

In the present invention, preferably, the solid light source lighting device further includes a storage part. The storage part is preferably configured to store an inherent forward voltage to the solid light source. The control circuit is preferably configured to determine the threshold based on the inherent forward voltage.

An illumination apparatus according to the present invention includes: the solid light source lighting device according to the present invention; and the solid light source to which DC power is supplied from the solid light source lighting device.

An illumination system according to the present invention includes: one or more illumination apparatuses and a controller. Each of the one or more illumination apparatuses is the illumination apparatus according to the present invention. The controller is configured to transmits, to the one or more illumination apparatuses, the dimming signal indicating the dimming ratio of the solid light source included each of the one or more illumination apparatuses.

As described above, according to the present invention, it is possible to shorten the response time period of actual optical output when the dimming control is performed so that the dimming ratio increases.

BRIEF DESCRIPTION OF DRAWINGS

Preferred embodiments of the present invention will now be described in further details. Other features and advantages of the present invention will become better understood with regard to the following detailed description and accompanying drawings where.

DESCRIPTION OF EMBODIMENTS

Hereinafter, embodiments of the present invention will be described with reference to drawings.

(First Embodiment)

Figure 1:
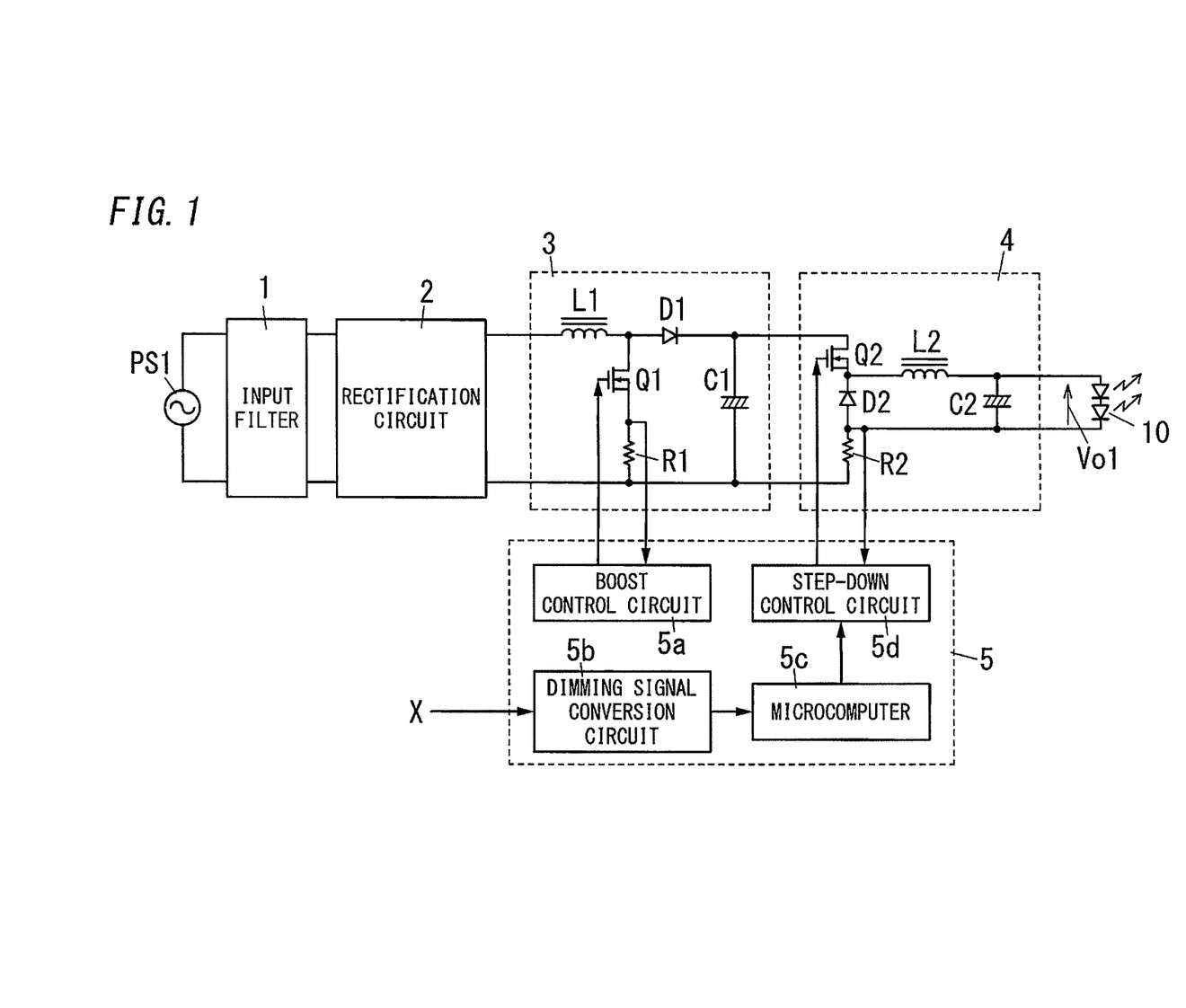
FIG. 1 is a circuit diagram illustrating a configuration of a solid light source lighting device according to a first embodiment.

As shown in FIG. 1, the solid light source lighting device according to the present embodiment includes an input filter 1, a rectification circuit 2, a boost chopper circuit 3, a step-down chopper circuit 4, and a control circuit 5. The step-down chopper circuit 4 is equivalent to a power supply circuit of the present invention.

The input filter 1 is configured to remove unnecessary frequency components, such as a noise, in a state where a commercial power supply PS1 is used as an input power supply.

The rectification circuit 2 is configured to output a rectified voltage generated by performing rectification (full wave rectification, half-wave rectification) of an AC voltage inputted via the input filter 1.

The boost chopper circuit 3 includes a series circuit of an inductor L1 and a diode D1 that are connected to the high potential side of the rectified voltage. A series circuit of a switching element Q1 and a resistor R1 is connected between output ends of the rectification circuit 2 via the inductor L1. The capacitor C1 is connected between output ends of the boost chopper circuit 3. Then, when the switching element Q1 turns on and turns off, the boost voltage occurs across the capacitor C1.

In the step-down chopper circuit 4, a switching element Q2, an inductor L2, an capacitor C2, and the resistor R2 are connected in series between the both ends of the capacitor C1. A diode D2 for regeneration is connected in parallel to the series circuit of the inductor L2 and the capacitor C2. Then, the solid light source 10 including LED (Light Emitting Diode) element, organic EL (Electro Luminescence) element, or the like is connected between both ends of the capacitor C2. Then, when the switching element Q2 turns on and turns off, the step-down voltage occurs across the capacitor C2.

The control circuit 5 includes a boost control circuit 5a, a dimming signal conversion circuit 5b, a microcomputer 5c, and a step-down control circuit 5d.

The boost control circuit 5a is configured to control a boost operation of the boost chopper circuit 3 by performing switching control of on/off of the switching element Q1. Specifically, the boost control circuit 5a is configured to compare a threshold with a current value of a current flowing through the inductor L1 detected by the current detecting part (not shown), and determine an on timing of the switching element Q1. The boost control circuit 5a is configured to compare a threshold with the voltage across the resistor R1 (a current value of a current flowing through the switching element Q1), and determine an off timing of the switching element Q1. The boost control circuit 5a is configured to control the boost voltage across the capacitor C1 so that the boost voltage becomes the prescribed voltage by adjusting the on timing and the off timing of the switching element Q1.

Then, the dimming signal X inputted to the control circuit 5 from the outside is a PWM signal that made duty cycles (on-duty) variable according to the dimming ratio. The dimming signal conversion circuit 5b is configured to convert the dimming signal X into a DC voltage according to the duty cycles, and output the above DC voltage to an A/D conversion port of the microcomputer 5c. As the microcomputer 5c, a microcomputer including in R8C/28 and 29 groups of Renesas Electronics Corporation, for example, is used.

Figure 2:
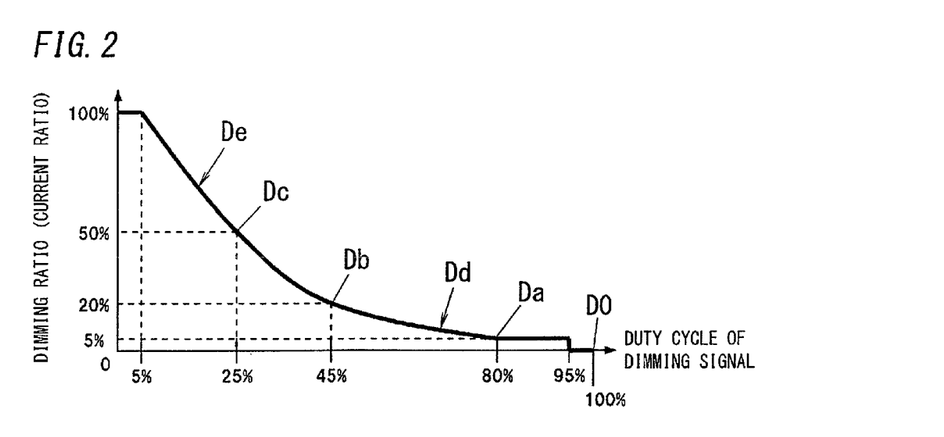
FIG. 2 is a characteristic diagram illustrating a dimming curve of the solid light source lighting device according to the first embodiment.

The microcomputer 5c is configured to store previously a dimming curve (dimming characteristic) shown in FIG. 2. A horizontal axis of the dimming curve denotes the duty cycles of the dimming signal X, and a vertical axis denotes the dimming ratio (value of output current). The dimming ratio decreases as the duty cycles increase. Specifically, when the duty cycles of the dimming signal X are 0 to 5%, the dimming ratio becomes 100% (full lighting). When the duty cycles of the dimming signal X are 95 to 100%, the dimming ratio becomes 0% (lighting-off state). In the duty cycles of the dimming signal X are 5 to 95%, the dimming ratio decreases according to the dimming curve as the duty cycles of the dimming signal X increases.

Then, the microcomputer 5c is configured to calculate the dimming ratio (output current value) according to the DC voltage (equivalent to the duty cycles of the dimming signal X) inputted from the dimming signal conversion circuit 5b with reference to the dimming in FIG. 2. The microcomputer 5c is configured to generate a step-down control signal S according to the calculated dimming ratio, and output the above step-down control signal S to the step-down control circuit 5d. This step-down control signal S is a signal that indicates the dimming ratio.

The step-down control circuit 5d is configured to control a step-down operation of the step-down chopper circuit 4 by performing switching control of on/off of the switching element Q2 based on the step-down control signal S. Specifically, the step-down control circuit 5d is configured to compare a threshold with a current value of a current flowing through the inductor L2 detected by the current detecting part (not shown), and determine the on timing of the switching element Q2. The step-down control circuit 5d is configured to compare a threshold with the voltage across the resistor R2 (the current value of the current flowing through the switching element Q2) of the resistor R2, and determine the off timing of the switching element Q2. The step-down control circuit 5d is configured to control the current (output current) flowing through the solid light source 10 so that the above current becomes a prescribed current according to the dimming ratio by adjusting the on timing and the off timing (equivalent to a control value of the present invention) of the switching element Q2 according to the dimming ratio indicated by the step-down control signal S.

There are a DC dimming of increasing and decreasing the direct current supplied to the solid light source 10, a burst dimming of performing the PWM control by turning on and turning off the direct current, and a dimming method combined the DC dimming and the burst dimming, as the dimming method of the solid light source 10.

Although not illustrated, in the case of the burst dimming and the dimming method combined the DC dimming and the burst dimming, the PWM signal for the burst dimming is outputted to the step-down control circuit 5d from the microcomputer 5c. Then, the step-down control circuit 5d is configured to perform dimming of the solid light source 10 by providing an operation section for performing the on-off operation of the switching element Q2, and a resting section for stopping the on-off operation of the switching element Q2.

By the capacitor C2 being connected to the output of the step-down chopper circuit 4, that is, the solid light source 10, the difference of the peak value and the bottom value of the output current is made small, and the output current is close to a DC wave with few current ripples. In this time, a voltage Vo1 (hereinafter, referred to as an "output voltage Vo1") across the capacitor C2 is substantially equal to a forward voltage of the solid light source 10. The forward voltage of the solid light source 10 is determined according to the dimming ratio (value of output current) based on the forward current-forward voltage characteristic of solid light source 10.

The dimming operation of the solid light source lighting device will be described.

Figure 3:
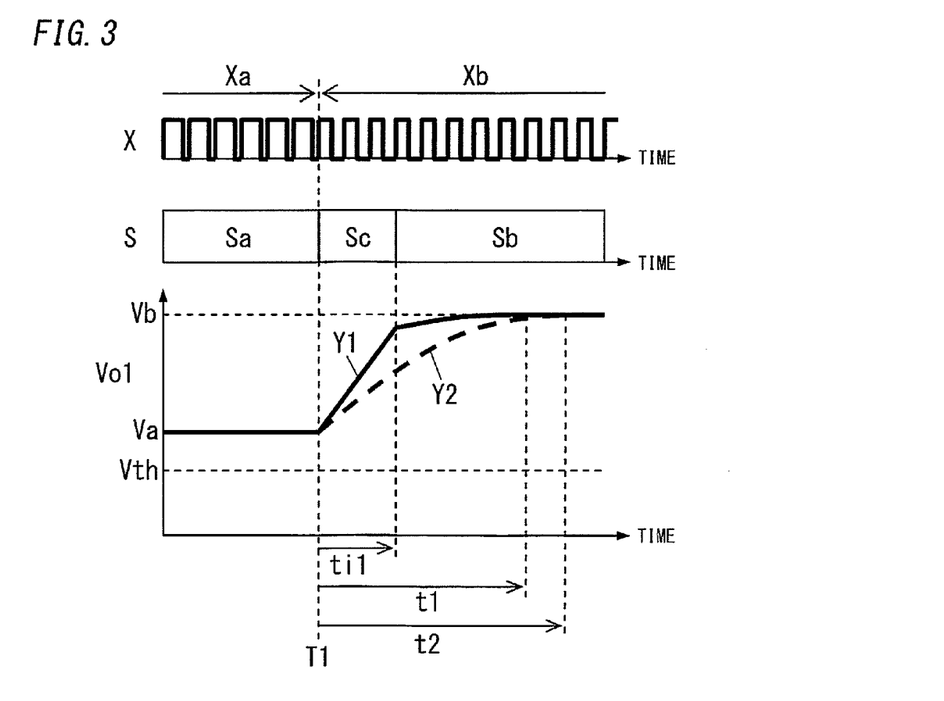
FIG. 3 is a wave form chart illustrating an operation of each part of the solid light source lighting device according to the first embodiment at the time of a dimming operation.

First, as shown in FIG. 3, the control circuit 5 is configured to receive a dimming signal Xa for indicating the third dimming ratio Da (refer to FIG. 2). The microcomputer 5c is configured to output a step-down control signal Sa indicating the third dimming ratio Da. The step-down control circuit 5d is configured to control the output voltage Vo1 so that the output voltage Vo1 is a voltage Va corresponding to the third dimming ratio Da indicated by the step-down control signal Sa, by adjusting the on timing and the off timing of the switching element Q2 according to the third dimming ratio Da.

Then, it is assumed that the dimming signal Xa indicating the present dimming ratio Da (third dimming ratio) is changed to the dimming signal Xb indicating the higher dimming ratio (first dimming ratio) Db (refer to FIG. 2) at the time T1.

Conventionally, the response time period t2 is taken until the output voltage Vo1 increase in the voltage Vb equivalent to the first dimming ratio Db from the voltage Va equivalent to the third dimming ratio Da (refer to Y2 in FIG. 3).

However, the microcomputer 5c received the dimming ratio Db is configured to output the step-down control signal Sc indicating the dimming ratio (second dimming ratio) Dc higher than the first dimming ratio Db from the time T1 to a time when the prescribed time period ti1 passes. The step-down control circuit 5d is configured to adjust the on timing and the off timing of the switching element Q2 according to the dimming ratio Dc indicated by the step-down control signal Sc. An inclination of the standup of the output voltage Vo1 from the voltage Va enlarges, and the output voltage Vo1 is close to the voltage Vb for a short time.

Then, the microcomputer 5c is configured to output the step-down control signal Sb indicating the first dimming ratio Db after the prescribed time period ti1 passes from the time T1. The step-down control circuit 5d is configured to adjust the on timing and the off timing of the switching element Q2 according to the first dimming ratio Db indicated by the step-down control signal Sb. The output voltage Vo1 reaches the voltage Vb from the vicinity of the voltage Vb. Therefore, the response time period t1, for which the output voltage Vo1 increases in the voltage Vb from the voltage Va, becomes shorter than the conventional response time period t2 (refer to Y1 in FIG. 3).

Vth in FIG. 3 indicates the forward voltage Vth in which the solid light source 10 starts lighting, and have a relationship of Vb>Va>Vth.

The set value of the second dimming ratio Dc may be any of a value corresponding to the first dimming ratio Db and a value calculated according to the difference of the third dimming ratio Da and the first dimming ratio Db. The set value of the prescribed time period ti1 may be any of a fixed time period, a time period corresponding to the first dimming ratio Db, and a time period calculated according to a difference of the third dimming ratio Da and the first dimming ratio Db. The second dimming ratio Dc and the prescribed time period ti1 may be even set arbitrarily so as to match with the design, specification, and the like of a solid light source lighting device.

The microcomputer 5c is configured to store the data table or the like in the memory incorporated in the microcomputer 5c, for example. Also, the microcomputer 5c is configured to output the step-down control signal Sc during the prescribed time period ti1 with reference to the data table or the like when detecting change of the dimming ratio.

Next, it is assumed that the dimming signal Xd indicating the higher dimming ratio Dd (refer to FIG. 2) is inputted instead of the dimming signal X0 indicating turning off is input at the lighting-off state of the solid light source 10.

Figure 4:
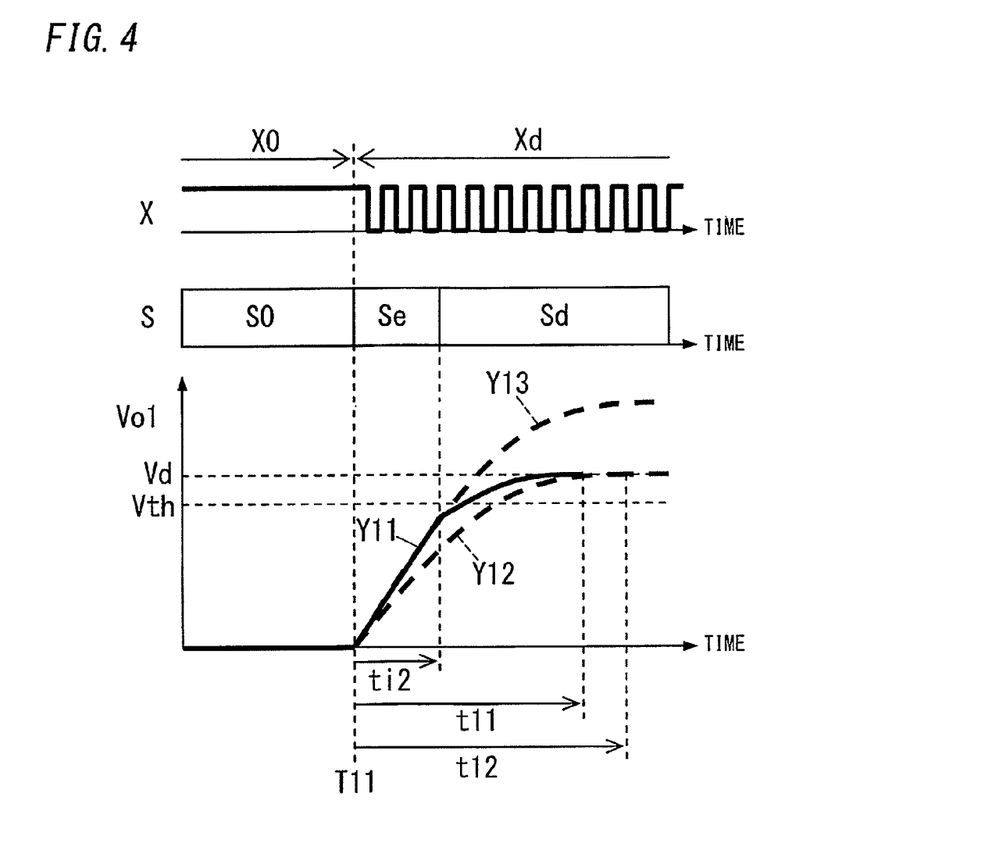
FIG. 4 is a wave form chart illustrating an operation of each part of the solid light source lighting device according to the first embodiment at the time of a dimming operation at the time of another dimming operation.

First, as shown in FIG. 4, the control circuit 5 is configured to receive the dimming signal X0 indicating the dimming ratio D0 (refer to FIG. 2) of turning off. The microcomputer 5c is configured to output the step-down control signal S0 indicating turning off. The step-down control circuit 5d is configured to adjust the on timing and the off timing of the switching element Q2 according to the dimming ratio D0 indicated by the step-down control signal S0, and accordingly, control the output voltage Vo1 to be less than the forward voltage Vth in which the solid light source 10 starts lighting.

Then, it is assumed that the dimming signal X0 indicating the present turning off state is changed into the dimming signal Xd indicating the higher dimming ratio (first dimming ratio) Dd (refer to FIG. 2) at the time T11.

Conventionally, the response time period t12 is taken until the output voltage Vo1 increases in the voltage Vd equivalent to the first dimming ratio Dd from a lighting-off state (refer to Y12 in FIG. 4).

However, the microcomputer 5c receiving the dimming ratio Dd is configured to output the step-down control signal Se indicating the dimming ratio (second dimming ratio) De (refer to FIG. 2) higher than the first dimming ratio Dd from the time T11 to a time when the prescribed time period ti2 passes. The step-down control circuit 5d is configured to adjust the on timing and the off timing of the switching element Q2 according to the dimming ratio De indicated by the step-down control signal Se. An inclination of the output voltage Vo1 of the standup from the turning-off state enlarges (refer to Y13 in FIG. 4), and the output voltage Vo1 is close to the voltage Vd for a short time.

Then, the microcomputer 5c is configured to output the step-down control signal Sd indicating the first dimming ratio Dd after the prescribed time period ti2 passes from the time T11. The step-down control circuit 5d is configured to adjust the on timing and the off timing of the switching element Q2 according to the first dimming ratio Dd indicated by the step-down control signal Sd. The output voltage Vo1 reaches the voltage Vd from the vicinity of the voltage Vd. Therefore, the response time period t11, in which the output voltage Vo1 increases in the voltage Vd from the lighting-off state, becomes shorter than the conventional response time period t12 (refer to Y11 in FIG. 4).

The set value of the second dimming ratio De may be any of a value corresponding to the first dimming ratio Dd, a value corresponding to the duration time period of the lighting-off state (that is, a value corresponding to a residual charge of the capacitor C2), and a value calculated from the relationship between the dimming ratio directly before the lighting-off state and the residual charge of the capacitor C2.

The set value of the prescribed time period ti2 may be any of a fixed time, a time period corresponding to the second dimming ratio De, a value calculated according to the relationship between the first dimming ratio Dd and the second dimming ratio De, and a value corresponding to the duration time period of the lighting-off state. The set value of the prescribed time period ti2 may be a value calculated from the relationship between the dimming ratio directly before the lighting-off state and the residual charge of the capacitor C2, or a value calculated according to the relationship between the duration time period of the lighting-off state and the second dimming ratio De.

The dimming ratio De and the prescribed time period ti2 may be even set arbitrarily to match with the design and specification of the solid light source lighting device.

Here, when the dimming signal X0 indicating turning off is input, the output voltage Vo1 applied to the both ends of the capacitor C2 should be less than the forward voltage Vth in which the solid light source 10 starts lighting. For example, the output voltage Vo1 at the input time of dimming signal X0 may be zero and the voltage less than the forward voltage Vth.

The microcomputer 5c is configured to store the data table or the like in the memory incorporated in the microcomputer 5c, for example. The microcomputer 5c is configured to output the step-down control signal Se with reference to the data table or the like when detecting change of the dimming ratio D until the prescribed time period ti2 passes.

Thus, at the time of lighting at the third dimming ratio Da, when the dimming signal Xb indicating the higher first dimming ratio Db is inputted, or when the dimming signal Xd indicating the higher first dimming ratio Dd from the lighting-off state is inputted, the response time period of the output voltage Vo1 is shorter than the conventional example. Therefore, when performing dimming control so that the dimming ratio becomes high, the solid light source lighting device can shorten the response time period of actual optical output. When performing the dimming control so that the dimming ratio becomes high, since shortening the response time period of actual optical output, the solid light source lighting device can expand the dimming ratio of the dimming limitation.

The step-down chopper circuit 4 is controlled by the microcomputer 5c. Therefore, since the above-mentioned effect is realizable, enlargement of equipment is not caused.

The microcomputer 5c need not to provide the output period of the above-mentioned step-down control signals Sc and Se when the response time period when the rise of the dimming ratio is permitted, for example, a case where the dimming ratio in lighting state increases by 50% or more, or a case where lighting control is carried out more than the dimming ratio of 50% from the lighting-off state.

In the present embodiment, the time period of the second dimming ratio Dc of the prescribed time period ti1 is provided between the third dimming ratio Da before change and the first dimming ratio Db after change. The time period of the second dimming ratio De of the prescribed time period ti2 is provided between the lighting-off state and the first dimming ratio Dd. That is, although a high dimming ratio period of the single step is provided between a time before the change of the dimming ratio and a time after the change of the dimming ratio, two or more steps of high dimming ratio periods may be provided between the time before the change of the dimming ratio and the time after the change of the dimming ratio. The change characteristic of the dimming ratio can be set to a straight line that has an arbitrary inclination, a curve that has an arbitrary curvature, or the like by providing the two or more steps of high dimming ratio periods.

(Second Embodiment)

Figure 5:
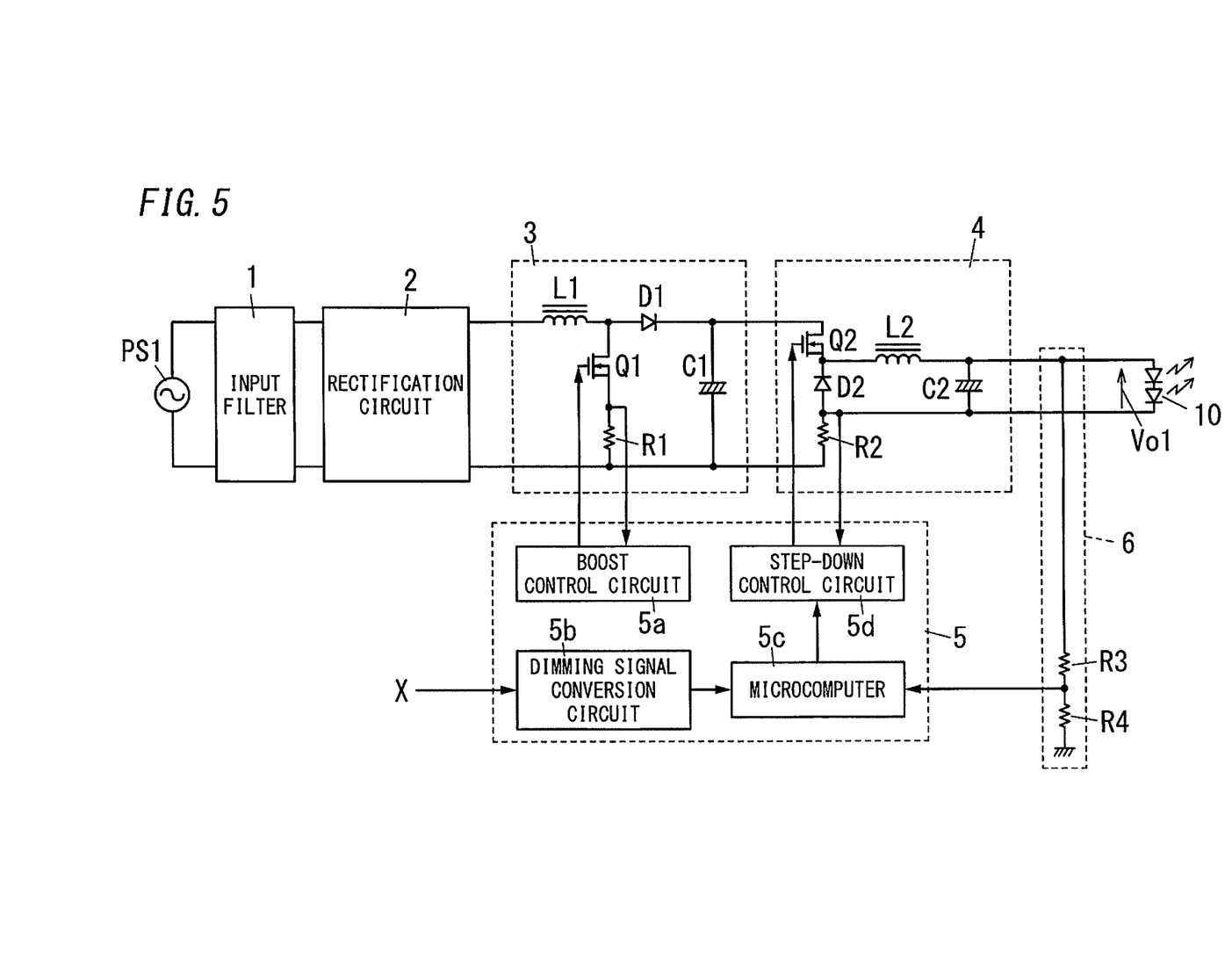
FIG. 5 is a circuit diagram illustrating a configuration of a solid light source lighting device according to a second embodiment.

As shown in FIG. 5, the solid light source lighting device according to the present embodiment includes a voltage detection circuit 6. Other configuration elements according to the present embodiment are the same as those of the first embodiment, the same configuration elements are assigned with same reference numerals, and explanation thereof will be omitted.

The voltage detection circuit 6 includes a series circuit of resistors R3 and R4 connected between the high voltage side of the capacitor C2 and the ground potential. A connecting point of the resistors R3 and R4 is connected to the A/D conversion port of the microcomputer 5c of the control circuit 5. That is, the detection value of the voltage across the solid light source 10 (output voltage Vo1) is inputted into the microcomputer 5c, and the microcomputer 5c is capable of obtaining the output voltage Vo1.

The dimming operation of this solid light source lighting device will be described.

Figure 6:
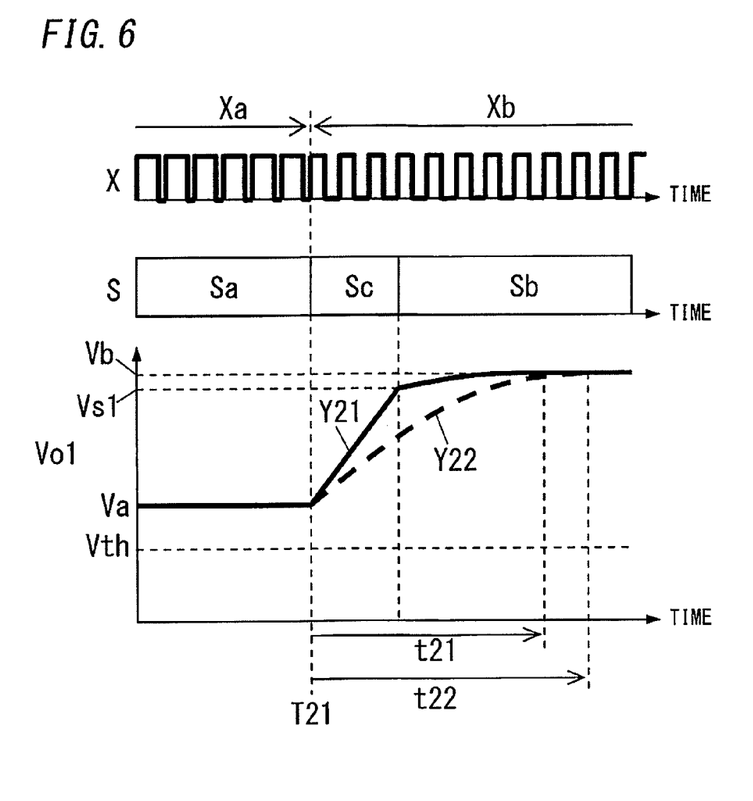
FIG. 6 is a wave form chart illustrating an operation of each part of the solid light source lighting device according to the second embodiment at the time of a dimming operation.

First, as shown in FIG. 6, the control circuit 5 is configured to receive the dimming signal Xa indicating the third dimming ratio Da (refer to FIG. 2). The microcomputer 5c is configured to output the step-down control signal Sa indicating the third dimming ratio Da. The step-down control circuit 5d is configured to adjust the on timing and the off timing of the switching element Q2 according to the third dimming ratio Da indicated by the step-down control signal Sa, and accordingly, control the output voltage Vo1 on the voltage Va according to the third dimming ratio Da.

Then, it is assumed that the dimming signal Xa indicating the present dimming ratio Da (third dimming ratio) is changed to the dimming signal Xb indicating the higher dimming ratio (first dimming ratio) Db (refer to FIG. 2) at the time T21.

Conventionally, the response time period t22 is taken until the output voltage Vo1 increases in the voltage Vb equivalent to the first dimming ratio Db from the voltage Va equivalent to the third dimming ratio Da (refer to Y22 in FIG. 6).

However, the microcomputer 5c receiving the first dimming ratio Db is configured to output the step-down control signal Sc indicating the dimming ratio (second dimming ratio) higher than the first dimming ratio Db from the time T21 to a time when the output voltage Vo1 increases and reaches a prescribed threshold Vs1. The step-down control circuit 5d is configured to adjust the on timing and the off timing of the switching element Q2 according to the second dimming ratio Dc (refer to FIG. 2) indicated by the step-down control signal Sc. An inclination of the output voltage Vo1 of the standup from the voltage Va enlarges, and the output voltage Vo1 is close to the voltage Vb for a short time.

Then, after the output voltage Vo1 increases and reaches the prescribed threshold Vs1, the microcomputer 5c is configured to output the step-down control signal Sb indicating the first dimming ratio Db. The step-down control circuit 5d is configured to adjust the on timing and the off timing of the switching element Q2 according to the first dimming ratio Db indicated by the step-down control signal Sb. The output voltage Vo1 reaches the voltage Vb from the vicinity of the voltage Vb. Therefore, the response time period t21, during which the output voltage Vo1 increases in the voltage Vb from the voltage Va, becomes shorter than the conventional response time period t22 (refer to Y21 in FIG. 6).

Vth in FIG. 6 denotes the forward voltage Vth in which the solid light source 10 starts lighting, and have a relationship of Vb>Vs1>Va>Vth.

The set value of the second dimming ratio Dc may be any of a value corresponding to the first dimming ratio Db, and a value calculated according to the difference between the third dimming ratio Da and the first dimming ratio Db. The set of the threshold Vs1 is set as a value that is higher than the forward voltage Va in the case where the solid light source 10 is turned on at the third dimming ratio Da, and lower than the forward voltage Vb in the case where the solid light source 10 is turned on at the first dimming ratio Db. The second dimming ratio Dc and the threshold Vs1 may be set arbitrarily to match with the design, the specification, and the like of the solid light source lighting device.

The microcomputer 5c is configured to store a data table or the like in the memory incorporated in the microcomputer 5c, for example. The microcomputer 5c is configured to generate the step-down control signal Sc and the threshold Vs1 with reference to the data table or the like when detecting change of the dimming ratio.

Figure 7:
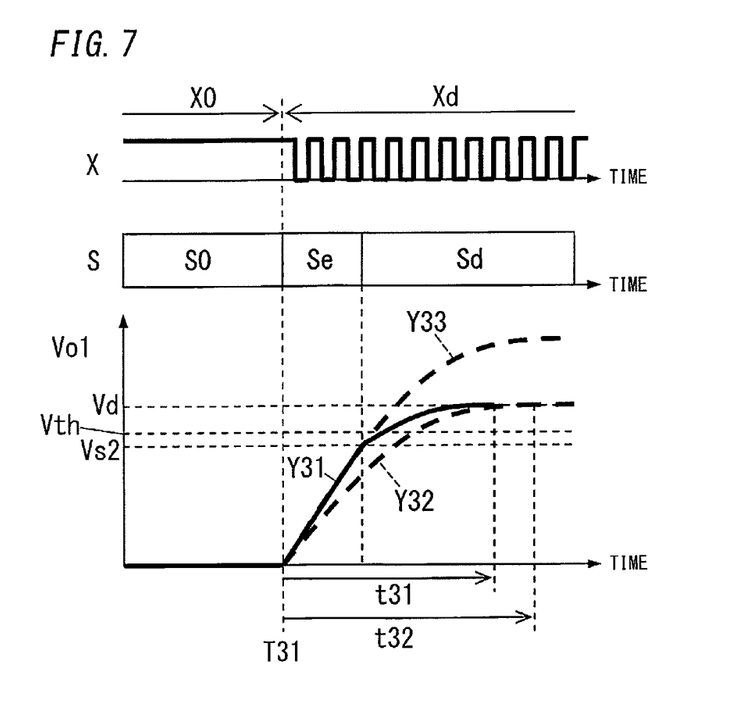
FIG. 7 is a wave form chart illustrating an operation of each part of the solid light source lighting device according to the second embodiment at the time of a dimming operation at the time of another dimming operation.

Next, it is assumed that the dimming signal Xd indicating the higher first dimming ratio Dd is changed from the dimming signal X0 indicating turning off at the lighting-off state of the solid light source 10.

First, as shown in FIG. 7, the control circuit 5 is configured to receive the dimming signal X0 indicating the dimming ratio D0 of turning off. The microcomputer 5c is configured to output the step-down control signal S0 indicating turning off. The step-down control circuit 5d is configured to control the output voltage Vo1 to less than the forward voltage Vth in which the solid light source 10 starts lighting by adjusting the on timing and the off timing of the switching element Q2 according to the dimming ratio D0 indicated by the step-down control signal S0.

Then, it is assumed that the dimming signal X0 indicating the present turning off state is changed to the dimming signal Xd indicating the higher dimming ratio (first dimming ratio) Dd at the time T31.

Conventionally, the response time period t32 is taken until the output voltage Vo1 increases in the voltage Vd equivalent to the first dimming ratio Dd from the lighting-off state (refer to Y32 in FIG. 7).

However, the microcomputer 5c receiving the first dimming ratio Dd is configured to output the step-down control signal Se indicating the dimming ratio (second dimming ratio) De higher than the first dimming ratio Dd from the time T31 to a time when the output voltage Vo1 increases and reaches a prescribed threshold Vs2. The step-down control circuit 5d is configured to adjust the on timing and the off timing of the switching element Q2 according to the second dimming ratio De indicated by the step-down control signal Se. An inclination of the output voltage Vo1 of the standup from the lighting-off state enlarges (refer to Y33 in FIG. 7), and the output voltage Vo1 is close to the voltage Vd for a short time.

Then, after the output voltage Vo1 increases and reaches the prescribed threshold Vs2, the microcomputer 5c is configured to output the step-down control signal Sd indicating the first dimming ratio Dd. The step-down control circuit 5d is configured to adjust the on timing and the off timing of the switching element Q2 according to the first dimming ratio Dd indicated by the step-down control signal Sd. The output voltage Vo1 reaches the voltage Vd from the vicinity of the voltage Vd. Therefore, the response time period t31, during which the output voltage Vo1 increases in the voltage Vd from the lighting-off state, becomes shorter than the conventional response time period t32 (refer to Y31 in FIG. 7).

The set value of the second dimming ratio De may be any of a value corresponding to the first dimming ratio Dd, and a detection value of the output voltage Vo1 by the voltage detection circuit 6 (value calculated with the residual charge of the capacitor C2 (duration time period of the lighting-off state)).

The set threshold Vs2 may be any of a value lower than the forward voltage Vd in the case where the solid light source 10 is turned on at the first dimming ratio Dd, and a value lower than the forward voltage Vth in which the solid light source 10 starts lighting.

The second dimming ratio De and the threshold Vs2 may be set arbitrarily to match with the design, the specification, and the like of the solid light source lighting device.

Here, in the case of the dimming signal X0 indicating the dimming ratio D0 of turning off, the output voltage Vo1 across the capacitor C2 may be even less than the forward voltage Vth in which the solid light source 10 starts lighting. For example, the output voltage Vo1 at the input time of the dimming signal X0 may be zero or a voltage less than the forward voltage Vth.

The microcomputer 5c is configured to store the data table or the like in the memory incorporated in the microcomputer 5c, for example. The microcomputer 5c is configured to generate the step-down control signal Se and the threshold Vs2 with reference to the data table or the like when detecting change of the dimming ratio.

Thus, at the time of lighting at the third dimming ratio Da, in the case of changing to the dimming signal Xb indicating the higher first dimming ratio Db, or in the case where the dimming signal Xd indicating the higher dimming ratio Dd from the lighting-off state, the response time period of the output voltage Vo1 is shortened less than a conventional time period. Therefore, when performing lighting control so that the dimming ratio increases, the solid light source lighting device can shorten the response time period of the actual optical power. Since the response time period of the actual optical power can be shortened when performing lighting control so that the dimming ratio increases, the solid light source lighting device is also capable of expanding the dimming ratio of the dimming limitation.

The output voltage Vo1 is compared with the threshold Vs1 or Vs2, and the time period during which the dimming ratio is temporarily high is set. Therefore, the time period during which the dimming ratio is temporarily high can be appropriately set without taking into consideration the residual charge of the capacitor C2.

The microcomputer 5c may not provide the output periods of the above-mentioned step-down control signals Sc and Se in the case where the response time period at the time of the rise of the dimming ratio is permitted, for example, a case where the dimming ratio increases by 50% or more at lighting state, or a case where the dimming ratio increases by 50% or more from the lighting-off state.

In the present embodiment, the time period of the second dimming ratio Dc specified by the threshold Vs1 is provided between the third dimming ratio Da before change and the first dimming ratio Db after change. The second dimming ratio Dc specified by the threshold Vs2 is provided between the lighting-off state and the first dimming ratio Dd. That is, although the high dimming ratio time period of the single step is provided between at the time before change of the dimming ratio and at the time after change of the dimming ratio, two or more steps of high dimming ratio periods may be provided between at the time before change of the dimming ratio and at the time after change of the dimming ratio. By the two or more steps of high dimming ratio periods is provided, the change characteristic of the dimming ratio can be set to the straight line that has an arbitrary inclination, the curve that has an arbitrary curvature, or the like.

(Third Embodiment)

In the solid light source lighting device according to the present embodiment, the microcomputer $5c$ is configured to perform the following operations with a storage part, such as EEPROM (Electrically Erasable Programmable Read-Only Memory) or a flash memory. The storage part, such as the EEPROM or the flash memory, may be built in the microcomputer $5c$, provided outside the microcomputer $5c$. For example, when R8C/28 and 29 groups of Renesas Electronics Corporation are used as the microcomputer $5c$, the flash memory is built in the microcomputer.

When an electrolytic condenser is used as the capacitor C2, the capacity of the capacitor C2 decreases as an accumulated lighting time period (energization time period) increases. That is, in this case, the capacity of the capacitor C2 decreases as the accumulated lighting time period is close to life time period. The accumulated lighting time period is an accumulated time period when a current flows thorough the capacitor C2 in a time period from the time when a current flows through the capacitor C2 at the first time to the present time.

Therefore, in the case of the first embodiment, even if the time period of the second dimming ratio Dc during the prescribed time period ti1 (refer to FIG. 3) or the time period of the second dimming ratio De during the prescribed time period ti2 (refer to FIG. 4) is provided, there is a possibility that each value of second dimming ratio Dc or De and the prescribed time period ti1 or ti2 needs to be changed according to an accumulated operating time period (operating time period) of solid light source lighting device. The accumulated operating time period of the solid light source lighting device is an accumulated time period when the solid light source lighting device is operated in a time period from the time when the solid light source lighting device is operated at the first time to the present time.

Here, the microcomputer $5c$ is configured to clock the operating time period (operating time period) of the solid light source lighting device. The microcomputer $5c$ is configured to store a clock result in the storage part. Then, the microcomputer $5c$ is configured to correct each value of second dimming ratio Dc or De and the prescribed time period ti1 or ti2 based on the clock result of the accumulated operating time period (operating time period) stored in the storage part. Therefore, it is possible to suppress dispersion in the dimming characteristic due to the capacity decreasing of the capacitor C2.

For example, the microcomputer $5c$ is configured to determine the prescribed time period ti1 or ti2 so that the prescribed time period ti1 or ti2 increases as the accumulated operating time period of the solid light source lighting device increases. In addition, the microcomputer $5c$ is configured to determine the second dimming ratio Dc or De so that the second dimming ratio Dc or De increases as the accumulated operating time period of the solid light source lighting device increases.

The microcomputer $5c$ may be configured to clock an accumulated time period (lighting time period) of the solid light source 10. In this case, the microcomputer $5c$ may be configured to store a clock result of the accumulated lighting time period in the storage part. Then, the microcomputer $5c$ may be configured to correct each value of second dimming ratio Dc or De, and the prescribed time period ti1 or ti2 based on the clock result of the accumulated lighting time period (lighting time period) stored in the storage part. The accumulated lighting time period of the solid light source 10 is an accumulated time when the solid light source 10 lights in the time period from the time when the solid light source 10 lights at the first time to the present time.

For example, the microcomputer $5c$ is configured to determine the prescribed time period ti1 or ti2 so that the prescribed time period ti1 or ti2 increases as the accumulated lighting time period of the solid light source 10 increases. In addition, the microcomputer $5c$ is configured to determine the second dimming ratio Dc or De so that the second dimming ratio Dc or De increases as the accumulated lighting time period of the solid light source 10 increases.

The forward voltages of solid light sources 10 have dispersion caused by individual differences or temperature characteristics. Therefore, in the case of the second embodiment, even if the time period of the second dimming ratio Dc (refer to FIG. 6) or the time period of the second dimming ratio De (refer to FIG. 7) is provided, there is a possibility that each value of the second dimming ratio Dc or De and the threshold Vs1 or Vs2 need to changed according to the dispersion in the forward voltages of the solid light sources 10. That is, there is a possibility that each value of the second dimming ratio Dc or De and the threshold Vs1 or Vs2 need to changed according to the dispersion in the forward voltages Vth at which the solid light sources 10 start lighting.

Then, the microcomputer $5c$ is configured to store the data of the inherent forward voltage Vth to the solid light source 10 to be used (forward voltage at which the solid light source 10 to be used start lighting) in the storage part. The microcomputer $5c$ is configured to correct each value of second dimming ratio Dc or De and the threshold Vs1 or Vs2 based on the inherent forward voltage Vth to the solid light source 10 to be used. Therefore, it is possible to suppress the dispersion in the dimming characteristic by the dispersion in the forward voltages Vth of the solid light sources 10.

For example, the microcomputer $5c$ is configured to determine the threshold Vs1 or Vs2 so that the threshold Vs1 or Vs2 increases as the forward voltage Vth increases, at which the solid light source 10 to be used start lighting. In addition, the microcomputer $5c$ is configured to determine the second dimming ratio Dc or De so that the second dimming ratio Dc or De increases as the forward voltage Vth of the solid light source 10 to be used increases.

(Fourth Embodiment)

Figure 8:
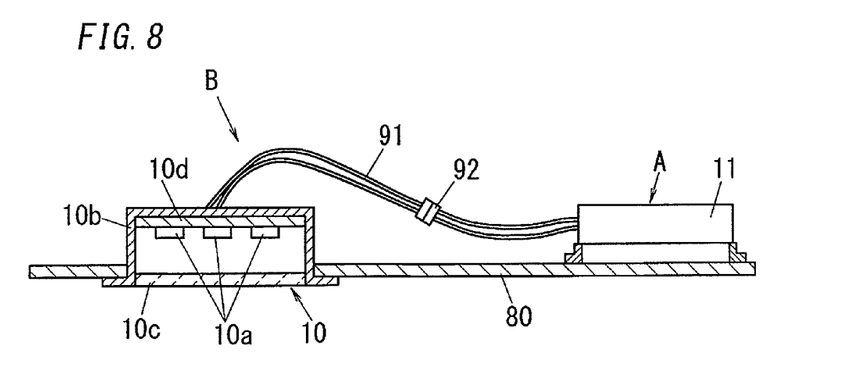
FIG. 8 is a cross sectional view illustrating a configuration of an illumination apparatus according to a fourth embodiment.

FIG. 8 shows a schematic structure of an illumination apparatus B using the solid light source lighting device according to any of the first to third embodiments (hereinafter, referred to as a solid light source lighting device A).

In the illumination apparatus B, the solid light source lighting device A is built in a case 11 different from a housing 10b of solid light source 10. Therefore, it is possible to thin the solid light source 10, and then, it is also possible to make the solid light source lighting device A as a separate type power supply unit smaller. Accordingly, it is hard that an install position is limited.

The housing 10b of the solid light source 10 includes a metal cylindrical body that has an opened end. An opened part of the end is covered with an optical diffuser 10c. A mounting board 10d in which two or more solid-light-sources elements 10a are mounted is arranged at a bottom surface on a side of the other end of the housing 10b so as to oppose to the optical diffuser 10c.

Then, the housing 10b is embedded into a ceiling 80. The solid light source 10 are connected, via lead wires 91 and the connector 92, to the solid light source lighting device A arranged in the underpart of the roof.

Figure 9:
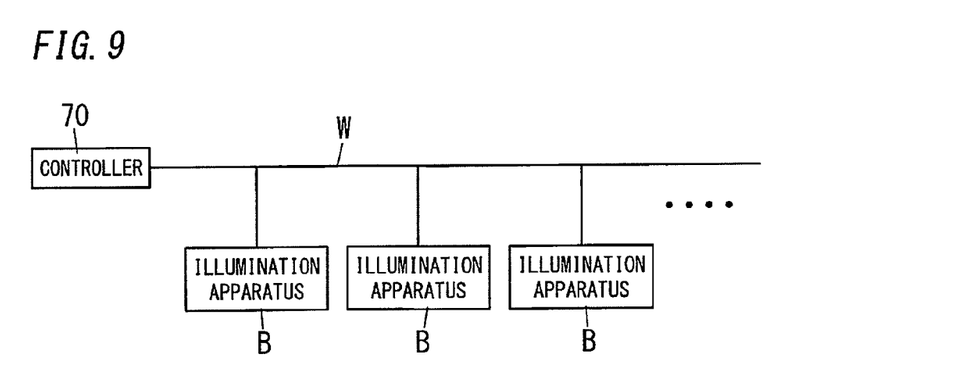
FIG. 9 is a cross sectional view illustrating a configuration of an illumination system according to the fourth embodiment.

Next, FIG. 9 shows a schematic configuration of an illumination system in which the two or more illumination apparatuses B are connected to a controller 70 via a communication wire W. The controller 70 is configured to transmit a dimming signal X to each of the illumination apparatuses B via the communication wire W. In each illumination apparatus B, the solid light source lighting device A is configured to perform a dimming operation according to the dimming signal X.

Also, in the illumination apparatus B of the present embodiment, and the illumination system using this illumination apparatus B, the solid light source lighting device A is configured to perform the same operation as that of either of the first and third embodiments. Therefore, it is possible to shorten the response time period of actual optical output when the dimming control is performed so that the dimming ratio becomes high.

Although the present invention has been described with reference to a certain preferred embodiment, numerous modifications and variations can be made by those skilled in the art without departing from the true spirit and scope of this invention, namely claims.

The invention claimed is:

1. A solid light source lighting device comprising:
a power supply circuit comprising at least one switching element, the power supply circuit being configured to output DC power by turning on and turning off the switching element;
a capacitor connected to a solid light source in parallel, the solid light source being connected between output ends of the power supply circuit; and
a control circuit configured to determine a control value for a switching operation of the switching element based on a dimming signal indicating a dimming ratio of the solid light source, the control circuit being configured to perform a switching control of the switching element based on the control value,
wherein the control circuit is configured, when performing the switching control of the switching element so that the dimming ratio increases due to the dimming signal indicating a first dimming ratio, to perform the switching control of the switching element based on the control value equivalent to a second dimming ratio higher than the first dimming ratio during a prescribed time period before the switching control of the switching element is performed based on the control value equivalent to the first dimming ratio.

2. The solid light source lighting device according to claim 1,
wherein the prescribed time period is:
a time period to a time when a prescribed time period passes from a time when the control circuit receives the dimming signal indicating the first dimming ratio while performing the switching control of the switching element based on the control value equivalent to a third dimming ratio lower than the first dimming ratio; or
a time period to a time when a prescribed time period passes from a time when the control circuit receives the dimming signal indicating the first dimming ratio while the solid light source lights off.

3. The solid light source lighting device according to claim 2, further comprising a storage part configured to store an operating time of the solid light source lighting device or a lighting time of the solid light source,
wherein the control circuit is configured to determine the prescribed time period based on the operating time period or the lighting time period.

4. An illumination apparatus comprising:
the solid light source lighting device according to claim 3; and
the solid light source to which DC power is supplied from the solid light source lighting device.

5. An illumination system comprising:
one or more illumination apparatuses, each of the one or more illumination apparatuses being the illumination apparatus according to claim 4; and
a controller configured to transmits, to the one or more illumination apparatuses, the dimming signal indicating the dimming ratio of the solid light source included each of the one or more illumination apparatuses.

6. An illumination apparatus comprising:
the solid light source lighting device according to claim 2; and
the solid light source to which DC power is supplied from the solid light source lighting device.

7. An illumination system comprising:
one or more illumination apparatuses, each of the one or more illumination apparatuses being the illumination apparatus according to claim 6; and
a controller configured to transmits, to the one or more illumination apparatuses, the dimming signal indicating the dimming ratio of the solid light source included each of the one or more illumination apparatuses.

8. The solid light source lighting device according to claim 1, further comprising a voltage detection circuit configured to detect a voltage across the solid light source,
wherein the prescribed time period is:
a time period to a time when the voltage across the solid light source becomes a threshold or more from a time when the control circuit receives the dimming signal indicating the first dimming ratio while performing the switching control of the switching element based on the control value equivalent to a third dimming ratio lower than the first dimming ratio; or
a time period to a time when the voltage across the solid light source is the threshold or more from a time when the control circuit receives the dimming signal indicating the first dimming ratio while the solid light source lights off.

9. The solid light source lighting device according to claim 8, further comprising a storage part configured to store an inherent forward voltage to the solid light source,
wherein the control circuit is configured to determine the threshold based on the inherent forward voltage.

10. An illumination apparatus comprising:
the solid light source lighting device according to claim 9; and
the solid light source to which DC power is supplied from the solid light source lighting device.

11. An illumination system comprising:
one or more illumination apparatuses, each of the one or more illumination apparatuses being the illumination apparatus according to claim 10; and
a controller configured to transmits, to the one or more illumination apparatuses, the dimming signal indicating the dimming ratio of the solid light source included each of the one or more illumination apparatuses.

12. An illumination apparatus comprising:
the solid light source lighting device according to claim 8; and
the solid light source to which DC power is supplied from the solid light source lighting device.

13. An illumination system comprising:
one or more illumination apparatuses, each of the one or more illumination apparatuses being the illumination apparatus according to claim 12; and
a controller configured to transmits, to the one or more illumination apparatuses, the dimming signal indicating the dimming ratio of the solid light source included each of the one or more illumination apparatuses.

14. An illumination apparatus comprising:
the solid light source lighting device according to claim 1; and
the solid light source to which DC power is supplied from the solid light source lighting device.

15. An illumination system comprising:
one or more illumination apparatuses, each of the one or more illumination apparatuses being the illumination apparatus according to claim 14; and
a controller configured to transmits, to the one or more illumination apparatuses, the dimming signal indicating the dimming ratio of the solid light source included each of the one or more illumination apparatuses.

* * * * *